United States Patent Office 3,699,071
Patented Oct. 17, 1972

3,699,071
HIGH MODULUS COMPOSITION COMPRISING HYDROCARBON OIL, RUBBER AND CARBON BLACK
Ivor W. Mills, Media, Glenn R. Dimeler, West Chester, and Merritt C. Kirk, Jr., Thornton, Pa., and Jackson S. Boyer, Claymont, Del., assignors to Sun Oil Company, Philadelphia, Pa.
No Drawing. Filed Jan. 17, 1969, Ser. No. 792,131
Int. Cl. C08d 11/02; C08k 1/22
U.S. Cl. 260—33.6 AQ    6 Claims

ABSTRACT OF THE DISCLOSURE

A novel rubber vulcanizate comprises carbon black dispersed in rubber, such as butyl rubber, ethylene-propylene rubber, EPDM rubbers, or in mixtures of such rubbers, and as a plasticizer or extender, a petroleum hydrocarbon oil containing 45 to 85 weight percent aromatics and no more than 0.5 weight percent polar compounds. At a given level of cure, such a novel rubber composition has higher tensile strength and modulus than a similar composition wherein the hydrocarbon oil contains the same percentage of aromatics and a greater percentage of polar compounds.

CROSS REFERENCES TO RELATED APPLICATIONS

Petroleum oils containing from 45 to 85 weight percent aromatics and from 0.0 to 0.5 weight percent polar compounds are disclosed in copending application, Ser. No. 636,493, filed May 5, 1967, of Ivor W. Mills, Glenn R. Dimeler and Merritt C. Kirk, Jr., entitled "Process for Preparing an Aromatic Oil and Non-Discoloring Rubber Composition Containing Said Oil." Such oils can also be prepared using the solvent extraction and/or acid treatment techniques disclosed in copending application, Ser. No. 657,438, filed May 29, 1967, of Abraham Schneider and Archibald P. Stuart, entitled "Rubber Containing Acid-Treated Oils and Its Preparation." The disclosure of both of the above-referred to applications (which are commonly assigned to the Sun Oil Company, to which is also assigned the present application) is hereby incorporated, by reference, into the present application.

BRIEF SUMMARY OF THE INVENTION

Various rubbers, such as the commercial EPDM rubbers, butyl rubbers and ethylene-propylene rubbers, can realize improvements in polymer properties associated with improvement in carbon black dispersion when there is also present a hydrocarbon oil having from 45 to 85% by weight of aromatics, and wherein the oil contains no more than 0.5% of polar compounds. Where the vulcanizate contains butyl, ethylene-propylene or EPDM rubbers, such rubber-oil-carbon black compositions can have a greater modulus development and higher tensile strength than do similar compositions, which are cured at the same level and in which the oil contains greater than 0.5% polar compounds. Preferably, the polar content is 0.0 weight percent. The improvement in modulus and tensile strength is most striking when the rubber is EPDM having an iodine number no greater than 10. The type of diene monomer which is copolymerized with ethylene and propylene in the EPDM rubber can also influence the development of the modulus when polar compounds are also present in the aromatic extender oil. Examples of diene monomers for such a copolymerization are 1,4-hexadiene, methylene norbornene, and dicyclopentadiene.

BACKGROUND OF THE INVENTION

Petroleum oils are widely used as plasticizers or extenders for natural or synthetic rubber compositions. The aforementioned copending application of Schneider and Stuart discloses a novel, light-colored rubber-oil composition wherein the mineral oil contains 10-45 weight percent of aromatic compounds, said rubber composition having a greater reflectance after aging for 24 hrs. in the presence of ultraviolet light than does a similar rubber composition containing a solvent raffinate oil of equivalent aromaticity.

This application of Schneider and Stuart also describes the preparation of oils which can be used in such rubber compositions, said preparation involving mixing a mineral oil starting material with 10-40 weight percent of anhydrous HF, thereby forming an acid phase insoluble in the mineral oil and containing components extracted from the starting material, and an oil phase comprising unextracted components of the starting material and containing dissolved acidic material, separating the acid phase from the oil phase, mixing the oil phase with an alkaline reagent to neutralize the undissolved acidic material and form neutralization product and separating the neutralization product from the oil phase. Under the conditions taught in the Schneider-Stuart application, such HF treatment can be used to selectively remove the non-hydrocarbon, heterocyclic polar compounds which are present in petroleum distillates and which must be removed in order to produce a non-discoloring rubber process oil.

Extraction of petroleum distillate with aromatic-selective solvents, such as furfural and phenol, is far less selective for the removal of such non-hydrocarbon impurities and, as is shown in the Schneider-Stuart application, the raffinate oil from such a solvent extraction can have a higher ratio of non-hydrocarbon impurity to aromatic hydrocarbons than did the feed to such solvent extraction, even though the weight percent of polar compounds in the raffinate is less than the percentage in the original petroleum distillate feed. However, such raffinate oils from solvent extraction (or the more highly-aromatic extract of such an extraction) can be treated with a Lewis acid ($BF_3$, $AlCl_3$, HF, etc.) to selectively remove non-hydrocarbon impurities and produce aromatic oils which contain little or no non-hydrocarbon impurities.

In the aforementioned copending application of Mills-Dimeler-Kirk, there is disclosed a hydrocarbon oil, useful for rubber processing, having a viscosity-gravity constant above 0.83, a viscosity at 100° F. of 40–10,000 SUS, an ultraviolet absorbency at 260 millimicrons greater than 8.0, boiling mainly above 540° F. and containing 50–85% of aromatic hydrocarbons, said oil having an initial ASTM D–1500 color lighter than 1.5 and an ASTM D–1500 color less than 3.0 when aged for 48 hrs. in the presence of ultraviolet light under test procedure A described in that application.

The aforementioned application of Mills, Dimeler and Kirk discloses a novel, light-colored rubber vulcanizate having good color stability when exposed to ultraviolet light and which contains as a plasticizer or extender from 5–60% by weight of a refined petroleum oil having a viscosity at 100° F. of from 40–10,000 SUS, containing from 45–85% of aromatic hydrocarbons and less than 10 p.p.m. of sulfur and nitrogen and having an ultraviolet absorbence at 260 millimicrons greater than 6.0.

The highly aromatic non-discoloring rubber process oils described in the Mills-Dimeler-Kirk application can be prepared by a two-stage aromatization process, disclosed in that application, from naphthenic distillates boiling mainly above 580° F., having a viscosity in the range of 40–10,000 SUS at 100° F. and containing non-hydrocarbon impurities comprising organic heterocyclic sulfur and nitrogen compounds and containing more than 30% aromatic hydrocarbons. The two-stage aromatization process is disclosed as being particularly useful for producing a non-discoloring rubber process oil having a viscosity greater than 100 SUS at 100° F., a flash point greater than 340° F. and containing from 45–70% of aromatic hydrocarbons.

The application also discloses that naphthenic oils of this aromatic content and, in particular, in the range of 45–60% of aromatic hydrocarbons, are particularly advantageous for compounding with certain types of EPDM polymers, particularly at oil loadings of 50 parts by volume and greater per 100 parts by weight of polymer. The application discloses, for example, that an EPDM polymer having a raw Mooney (M.L. 4) of 72, an iodine number of 17 and containing 8 weight percent of diene, when compounded with naphthenic oil containing 45–60% of aromatic hydrocarbons will have good processing characteristics, such as extrusion rate, and the resulting rubber article will have better tensile properties than will a similar compound containing an equal volume of an oil of lower aromaticity. In particular, the rubber article containing the 45–60% aromatic naphthenic oil will have a higher tensile, higher tear strength, and a much greater modulus (100%) after aging 70 hrs. at 302° F. than will a similar rubber composition containing an equal volume of a 30–35% aromatic oil.

In addition, the Mills-Dimeler-Kirk application disclosed that, when the 45–60% aromatic oil is one of the novel two-stage oils disclosed therein, the color of the rubber product after aging in the presence of sunlight will be no darker (and will usually be lighter) than the color of a similarly compounded rubber article containing a prior art naphthenic oil of 30–35% aromatic content.

In view of the disclosures in the Schneider-Stuart application and in the Mills-Dimeler-Kirk application, it is apparent that it is desirable that a petroleum distillate must be subjected to additional refining, as with HF or hydrogen, in order to remove the non-hydrocarbon impurities (i.e., polar aromatics) if one wishes to improve the ultraviolet stability of light colored rubber compositions containing petroleum distillate oils as extenders or plasticizers. As is taught in the Mills-Dimeler-Kirk application, conventional refining with an aromatic selective solvent is not selective for removal of the polar aromatic impurities, but also removes some of the desirable aromatic hydrocarbons from the petroleum distillate.

The production of non-discoloring rubber oils by selective removal of non-hydrocarbon impurities from petroleum distillates or extracts containing 10–90% aromatics by weight, entails considerable processing expense and, particularly in the case of oils containing from 45–85% aromatic hydrocarbons and less than 0.5 wt. percent polar compounds, such processing would not be considered to be economically justified for oils which are to be used in dark-colored rubbers, particularly those rubbers which contain carbon black. Although increased aromaticity (e.g., oils containing 45–85% aromatic hydrocarbons) greatly aids in dispersing the carbon black in rubber, there has heretofore been no reason for compounding rubber and carbon black with from 15 to 200 parts by weight per 100 parts of the rubber of a refined petroleum oil containing from 45–85 wt. percent of aromatic hydrocarbons, from 0.0 to 0.5% by weight of polar compounds and having a viscosity at 100° F. of from 40–10,000 SUS.

FURTHER DESCRIPTION OF THE INVENTION

The present invention discloses the discovery that a rubber vulcanizate composition comprising carbon black dispersed in a rubber and which also contains as a plasticizer or extender such a refined petroleum oil can possess advantages over similar carbon black-rubber compositions of the prior art wherein the hydrocarbon oil has the same weight percent of aromatic compounds but contains a greater weight percent of polar compounds.

In particular, when the rubber composition contains at least 10% of butyl rubber, ethylene-propylene elastomer, EPDM (ethylene-propylene elastomer which is copolymerized with a conjugated diolefin) or mixtures thereof, the present invention can be used to produce rubber-oil-carbon black vulcanizate compositions having higher tensile strengths, improved processing properties and greater modulus development at the same degree of cure than could heretofore be produced utilizing petroleum oils containing from 45–85% aromatics. The improvement in the rubber-oil-carbon black compositions of the present invention, over similar prior art vulcanizate, is effected by utilizing an oil containing from 45–85 wt. percent of aromatics (by gel analysis) and less than 0.5% of polar compounds as measured by the ASTM D–2007–62–T clay-gel analysis.

Such oils can be prepared from petroleum distillates, or from solvent-extracted petroleum fractions, by selectively removing polar compounds from such oils while maintaining high total aromaticity. One such means of selective removal of the polar compounds is by contacting the oil with from 10–40% by weight of anhydrous hydrogen fluoride to form an acid phase insoluble in the mineral oil and containing components extracted from the starting material, and an oil phase comprising unextracted components of said starting material including 70–96% of the aromatics in the starting material and containing dissolved acidic material. The acid phase is then separated from the oil phase, the oil phase mixed with an alkaline reagent to neutralize the dissolved acidic material and form neutralization product and, finally, the neutralization products are separated from the oil phase. The processing techniques disclosed in the aforementioned Schneider-Stuart application can be utilized in such HF treatment.

The novel oils of the aforementioned Mills-Dimeler-Kirk application, which contain less than 0.5% polar compounds, can also be used in our novel rubber-oil-carbon black vulcanizate. Polar compounds can also be selectively removed from mineral oils containing from 10–90% aromatics, by contacting the oil, preferably at a temperature in the range from 100°–300° F., with a substantially desolvated molecular sieve zeolite, preferably an acidic alumino-silicate zeolite having an ignition loss at 1200° F. of from 0.1–10 wt. percent, a pore diameter in the range of 6–15 A., and which is at least 15% crystalline. Suitable acidic alumino-silicate zeolites are disclosed in U.S. Pat. No. 3,396,203, issued Aug. 6, 1968, for example.

Our preferred oils, containing from 45–85 wt. percent aromatics, can be prepared from mineral oils which contain less than 45% aromatic hydrocarbons, by removing polar compounds from such oils (as by with acid or with acidic molecular sieve zeolites) by concentrating the aromatics in such oils by extraction with aromatic selective solvents. The aromatic content of such oils can also be increased by contacting the oil in the presence of hydrogen with a hydrogenation-dehydrogenation catalyst under conditions such that some of the non-aromatic hydrocarbons in the oil are converted to aromatic hydrocarbons (as with a solid, sulfided nickel-molybdenum hydrogenation catalyst at a temperature below 775° F. and a pressure below 1500 p.s.i.g.—see the aforementioned Mills-Dimeler-Kirk application).

Another advantage of the present invention is that the extrusion rate (at constant torque) can be higher or, at a constant extrusion rate, the torque can be lower, during the compounding of rubber-oil-carbon black dispersions than when compounding comparable prior art compositions. The heat build up on flexing is also less when the present invention is practiced.

ILLUSTRATIVE EXAMPLES

Example I illustrates the preparation of a rubber-carbon black-oil vulcanizate wherein the rubber used is an EPDM polymer which exhibits a great deal of sensitivity of modulus development when compounded with a highly aromatic (47 wt. percent by gel analysis) mineral oil which also contains 2.7% of polar compounds. Example II shows the improvement in modulus development and tensile strength when an oil of about the same aromaticity, but containing less than 0.5% of polar compounds, is substituted for the oil of Example I. Example III shows the degree of improvement in modulus development and in tensile strength which can be obtained in a similar vulcanizate to that of Example I and wherein the oil contains only about 1% of polar compounds. Example IV illustrates that EPDM polymers wherein dicyclopentadiene is the diene and having iodine numbers greater than 15 are less sensitive to polar compounds in the oil than are EPDM polymers, such as in Examples I–III, having iodine numbers of 10 or less and wherein the copolymerized diene is 1,4-hexadiene. Example V shows that some improvement in modulus and tensile can be obtained in rubber-oil-carbon black vulcanize compounded from the less sensitive EPDM rubbers when the oil contains from 45–85 wt. percent aromatics and less than 0.5% polar compounds. Example VI shows a similar vulcanizate to that of Examples IV and V but in which the oil had 1.1% polar compounds.

Example I

An EPDM polymer having a raw Mooney (M.L. 4) of 78, an iodine number of 10, and in which 5% of 1,4-hexadiene was the diene monomer utilized in the coprecipitation, is compounded with carbon black, oil and conventional vulcanizing and curing agents in accordance with the formulation shown in Table I. The oil utilized was a naphthenic acid-free distillate of a naphthenic crude oil which was derived by the process of U.S. Pat. No. 3,184,396, issued May 18, 1965. Properties of this oil, and of the oils used in the remaining examples, are listed in Table II.

Table III shows properties of the resulting vulcanizate (and of similar vulcanizates of the remaining examples) when the compound was vulcanized to an optimum state of cure as determined on the Monsanto oscillating disk rheometer. Table III also shows the improvement in processability (illustrated by the extrusion and torque rates) which can be obtained by practice of the present invention.

Example II

Example I is repeated except that the oil has 46% aromatic compounds and 0.1% polar compounds. This oil is obtained by a single stage hydrorefining of the oil of Example I utilizing sulfided nickel-molybdenum oxide catalyst, as shown in the above-referred to copending application of Mills, Dimeler and Kirk. The hydrorefining was effected at 1245 p.s.i.g. of 100% hydrogen, at a fresh feed LHSV of 0.1 and at 625° F.

Example III

Example II is repeated except that the oil contains 46% aromatic compounds and 1.1% polar compounds. This oil was obtained by the hydrorefining of Example II except that 80% hydrogen was used and the fresh feed LHSV was 0.4.

Similar results to this example can be obtained by an oil obtained by blending the oils of Examples I and II to produce an oil having 1.1% polar compounds and about 46% aromatics.

Example IV

Example I was repeated except that the EPDM polymer was prepared by utilizing 8% of dicyclopentadiene as the diene monomer. This EPDM rubber had an iodine number of 17 and a raw Mooney (M.L. 4) of 72. The properties of the oil and of the resulting vulcanizate are shown in Tables II and III, respectively.

Example V

Example II is repeated except that the EPDM polymer used is that of Example IV.

Example VI

Example III is repeated except that the EPDM polymer used is that of Example IV.

The beneficial results illustrated in the above examples are particularly apparent when the oil contains more than 50% of aromatic hydrocarbons (and from 0.0–0.5% polar compounds) and when there is at least one part by weight of carbon black for each 2 parts by weight of rubber.

TABLE I.—COMPOUND FORMULATION

| | Parts by weight |
|---|---|
| Polymer | 100.0 |
| HAF black | 75.0 |
| Oil | 50.0 |
| Zinc oxide | 5.0 |
| Sulfur | 1.5 |
| Tetramethyl thiuram monosulfide | 1.5 |
| Mercaptobenzothiazole | 0.5 |

TABLE II.—PHYSICAL PROPERTIES OF OILS USED IN EXAMPLES

| Example Nos. | I | II | III | IV | V | V |
|---|---|---|---|---|---|---|
| Viscosity, SUS/210° F | 87.2 | 84.9 | 84.7 | 87.2 | 84.9 | 84.7 |
| Viscosity, SUS/100° F | 2,525 | 2,175 | 2,202 | 2,525 | 2,175 | 2,202 |
| Density, g./ml | 0.945 | 0.935 | 0.939 | 0.945 | 0.935 | 0.939 |
| Viscosity-gravity-constant | 0.889 | 0.880 | 0.882 | 0.889 | 0.880 | 0.882 |
| Weight percent aromatics (by gel analysis) | 47 | 46 | 46 | 47 | 46 | 46 |
| Wt. percent polar compounds | 2.7 | 0.1 | 1.1 | 2.7 | 0.1 | 1.1 |

TABLE III—PROPERTIES OF VULCANIZATES

| Example Nos. | I | II | III | IV | V | VI |
|---|---|---|---|---|---|---|
| Extrusion rate (constant torque) in./min | 62.0 | 71.0 | 66.8 | 58 | 60 | 58 |
| Torque (constant extrusion rate) in./lb | 275 | 253 | 262 | 280 | 280 | 280 |
| 300% modulus (p.s.i.) | 895 | 1,000 | 950 | 1,650 | 1,700 | 1,675 |
| Tensile strength (p.s.i.) | 2,575 | 2,900 | 2,775 | 2,175 | 2,275 | 2,250 |

The invention claimed is:

1. A rubber vulcanizate composition comprising carbon black dispersed in a rubber selected from the group consisting of sulfur-curable, ethylene-propylene elastomers and which vulcanizate also contains as a plasticizer or extender for each 100 parts of said rubber from 15 parts to 200 parts by weight of a refined petroleum oil containing from 45–60 wt. percent of aromatic hydrocarbons, from 0.0 to 0.5% by weight of polar compounds and having a viscosity at 100° F. from 40 to 10,000 SUS.

2. Composition according to claim 1 wherein said sulfur-curable, ethylene-propylene elastomer is a copolymer with a third monomer selected from the group consisting of 1,4-hexadiene, methylene norbornene or dicyclopentadiene.

3. Composition according to claim 1 wherein said rubber has an iodine number no greater than 15.

4. Composition according to claim 3 wherein said iodine number is no greater than 10.

5. Composition according to claim 3 where the oil loading is at least 50 parts by volume per 100 parts by weight of said rubber.

6. Composition according to claim 4 wherein said oil contains more than 50% of aromatic hydrocarbons and wherein there is at least one part by weight of carbon black for each 2 parts by weight of rubber.

References Cited

UNITED STATES PATENTS

| | | | |
|---|---|---|---|
| 3,328,293 | 6/1967 | Brenken | 208—264 |
| 3,487,012 | 12/1969 | Plummer et al. | 208—264 |
| 3,514,395 | 5/1970 | McVay et al. | 208—264 |
| 3,595,776 | 7/1971 | Davidson et al. | 208—264 |
| 3,189,539 | 6/1965 | Sieg | 208—91 |
| 3,219,620 | 11/1065 | Fear | 260—33.6 AO |
| 3,369,999 | 2/1968 | Donaldson et al. | 208—210 |
| 3,392,112 | 7/1968 | Bercik et al. | 208—210 |

OTHER REFERENCES

Morton: Introduction to Rubber Technology (Reinhold) (New York) (1959), pp. 169–170.

Waddell et al.: Rubber Age, 94, 427–428 and 432–433 (1963).

Weinstock et al.: Ind. Eng. Chem., 45, 1035–1043 (1953).

ALLAN LIEBERMAN, Primary Examiner

U.S. Cl. X.R.

260—41.5 R